United States Patent [19]

Breckenridge

[11] 4,445,657

[45] May 1, 1984

[54] SPRAY BOOM MOUNTING ASSEMBLY

[76] Inventor: Gerald H. Breckenridge, Rte. 1, Box 169, McCroy, Ark. 72101

[21] Appl. No.: 310,463

[22] Filed: Oct. 13, 1981

[51] Int. Cl.³ .............................................. F16L 3/08
[52] U.S. Cl. .................................... 248/73; 24/489; 248/74.1; 248/316.5; 24/517; 24/521
[58] Field of Search .................. 248/73, 74 R, 65, 67, 248/67.5, 67.7, 324, 316 B; 24/243 E, 243 R, 248 SA, 253, 201 A, 20 CW

[56] References Cited

U.S. PATENT DOCUMENTS

| | | | |
|---|---|---|---|
| 2,550,001 | 4/1951 | Button | 248/74 R |
| 3,167,286 | 1/1965 | Sherburne | 248/74 R |
| 3,756,096 | 9/1973 | Bolden | 248/316 B |
| 3,845,521 | 11/1974 | McNichol | 24/243 R |

FOREIGN PATENT DOCUMENTS 509529  9/1930  Fed. Rep. of Germany .... 248/74 R

Primary Examiner—Ramon S. Britts
Assistant Examiner—Ramon O. Ramirez
Attorney, Agent, or Firm—Stephen D. Carver

[57] ABSTRACT

A clamping system for securely mounting a spray boom assembly for use with an agrichemical applicator airplane. The spray boom is preferably in the cross section of an airfoil, and is adapted to be secured relative to the wing in a suitable, noninterferring position by a jaw mounting system. The system includes an elongated strut secured at a remote end to the airplane wing and an integral, spaced-apart jaw end which cooperates with a moveable jaw member pivotally coupled to it. The jaw members may be locked together about the spray boom by a jaw locking handle pivotally coupled to the jaw member. The handle receives a barrel connecting link within a tracking groove, which is displaced through an over center action by rotation of the jaw handle to releasably secure the spray boom within the jaws.

8 Claims, 14 Drawing Figures

SPRAY BOOM MOUNTING ASSEMBLY

BACKGROUND OF THE INVENTION

This invention relates broadly to agricultural spray equipment. More particularly, the present invention is concerned with a clamping system adapted to mount a spray boom system to an airplane.

In the prior art a variety of attempts have been made to mount spray boom assemblies for proper operation relative to the wings of an aircraft. As will be appreciated by those skilled in the art, the typical spray boom, and the hardware which mounts it, is subject to extreme stresses. For example, mechanical stress resulting from the weight of the apparatus necessitates extremely durable clamps. Where corrosive chemicals are sprayed, rapid deterioration of metal parts may occur. Where weight is added because of design reinforcement, a disadvantage occurs. Moreover, the geometrical configuration of the spray boom assembly, and the placement of the assembly relative to the wing, directly affect the areodynamic characteristics of the airplane. For example, if placed in the wrong place, excessive air turbulance will be created, increasing both the mechanical strain on the spray boom assembly and the control difficulties of the pilot.

In the prior art aluminum spray boom assemblies have been employed. However, such apparatus is deficient in that it is rapidly corroded. For longer life and better reliability stainless steel spray booms are desireable. However, no reliable mounting clamp systems are known to me for safely dependably mounting the relatively massive steel boom assemblies in such a manner as to be adequate for the actual conditions of use.

SUMMARY OF THE INVENTION

The present invention comprises a spray boom mounting assembly ideally adapted for airplanes used in agricultural crop spraying and the like.

To this effect the assembly preferably comprises a first elongated strut having an offset remote end adapted to be coupled to one portion of the wing of the airplane and an integral, spaced-apart jaw end. The strut jaw end and a rigid, generally arcuate moveable jaw portion pivotally coupled to the strut jaw cooperate to grasp a spray boom therebetween. Preferably the spray boom is made of stainless steel and is configured in the form of an airfoil to reduce aerodynamic drag and prevent deleterious turbulence generation.

Preferably the strut jaws are controlled by a jaw locking handle pivotally mounted to the upper jaw. The upper jaw portion is pivoted at its rear to the strut jaw end, and is normally biased by a spring to an open position. The jaw locking handle includes a pair of notches which form an aperture for receiving a barrel connecting link assembly. When the barrel connecting link is coupled to the jaw handle, it may be pivoted to a rearward clamping position, thereby moving the notch over center, and thus locking the jaws.

The barrel connecting means preferably includes an elongated, threaded stem terminating in a clevis pivotally coupled to the lower jaw end, and an upper, substantially cylindrical barrel having a pair of flanges defined on opposite ends. The threaded stem penetrates the barrel, and terminates in a suitable fastener which captures a coaxially positioned spring. Thus the barrel connector is yieldably urged toward a closed position with its flanges on opposite sides of the aperture notches, whereby to resist disengagement of the barrel cylinder from the tracking aperture.

In alternate forms of the invention padding systems may be employed inside the jaw surfaces to provide a gripping surface for engagement of the spray boom. Individual pad systems may be employed, or alternatively the jaw pads may be mounted on a pad assembly adapted to be received within and between the jaw members.

Thus an object of the present invention is to provide a reliable system for mounting a spray boom assembly.

A similar object is to provide a reliable spray boom mounting clamp of the character described which may be quickly, manually moved to an open position.

A still further object of the present invention is to provide a spray boom mounting system adapted to be ultimately attached either over or under the wing of an airplane.

Yet another object of the present invention is to provide a spray boom mounting system ideally adapted for securing lightweight areodynamically configured aluminum spray booms.

Another object of the present invention is to provide a corrosion resistant spray boom system.

A related object is to provide a quick release spray boom system.

Yet another object is to provide a tight and positive lock to the spray boom, without the need for a pad or wrapping around the spray boom whether made of aluminum or stainless steel.

Another object is to avoid or eliminate the danger of wearing a hole in the boom as a result of friction or vibration.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and which like reference numerals have been employed throughout to indicate like parts in the various views.

DETAILED DESCRIPTION OF THE DRAWINGS

Figure 1:
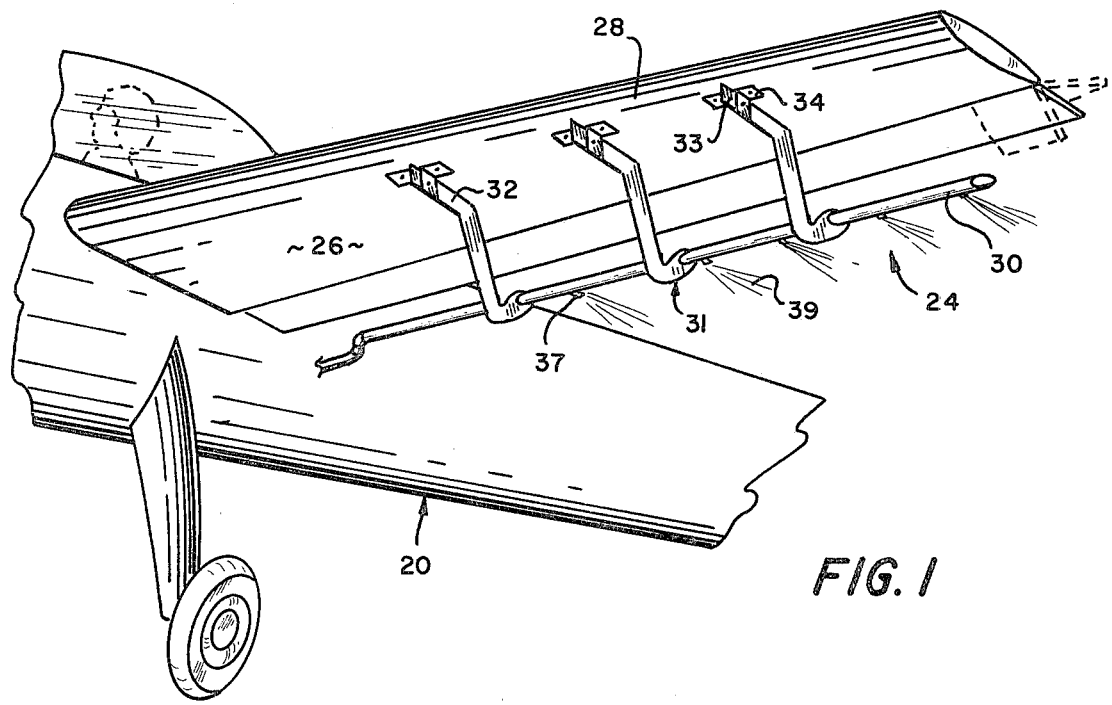
FIG. 1 is a pictorial view of an airplane in which the teachings of the present invention have been employed, with parts thereof broken away for brevity.
Figure 2:
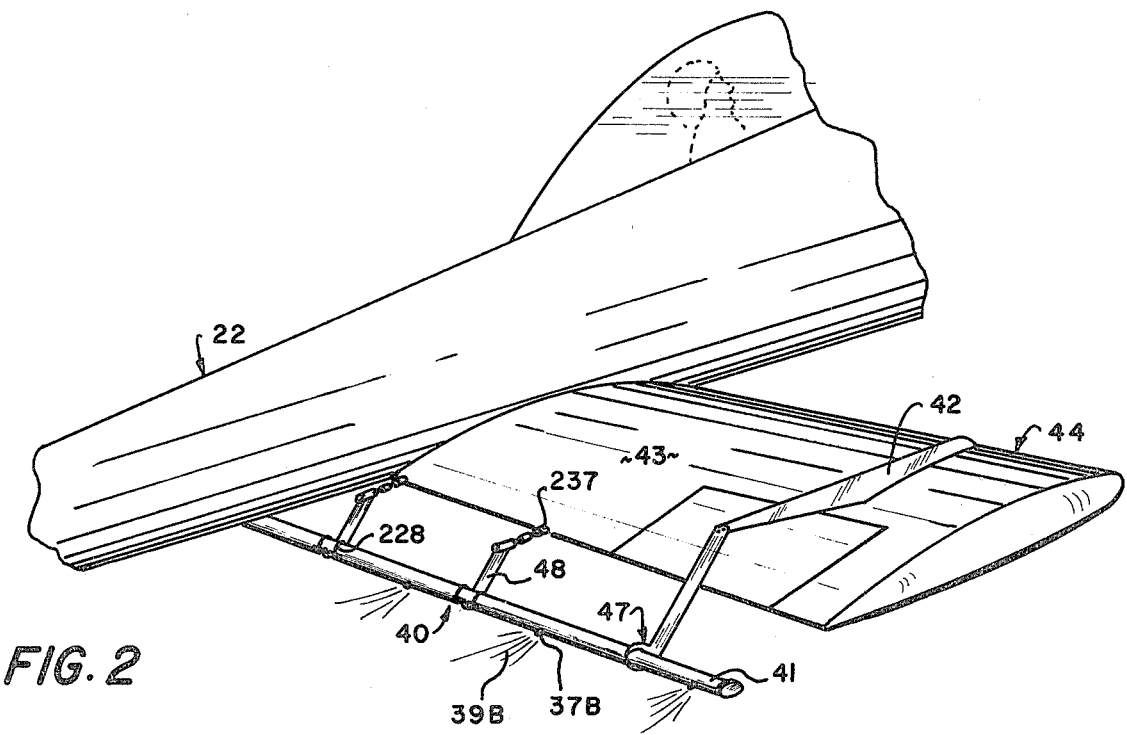
FIG. 2 is a similar pictorial view illustrating installation of alternative embodiments of the present invention.

With initial reference now to FIGS. 1 and 2 of the drawings, a typical agri-chemical spray aircraft 20 includes a spray boom apparatus 24 mounted at the underside 26 of each of its wings 28. Apparatus 24 includes an elongated, preferably aluminum boom 30, which is supported by the jaw structure 31 at the end of struts 32. Struts 32 are secured by suitable couplings 34 to wing under surface 26. Preferably boom 30 is configured in the form of an airfoil, whereby to reduce turbulence otherwise generated by its use. Chemicals are introduced interiorly of the boom, and spray 39 is outputted from "TEEJET" nozzles 37.

Aircraft (FIG. 2) 22 includes a spray boom assembly generally designated by the reference numeral 40 including a similar boom member 41 secured by a main strut 42 secured to the upper surface 43 of wing 44. The jaw ends 47 of the struts 42 are clamped about boom 41 to support it. Intermediate struts 48, which will be described in more detail later hereinafter, add additional strength. Again, spray 39B is outputted from nozzles 37B.

Figure 3:
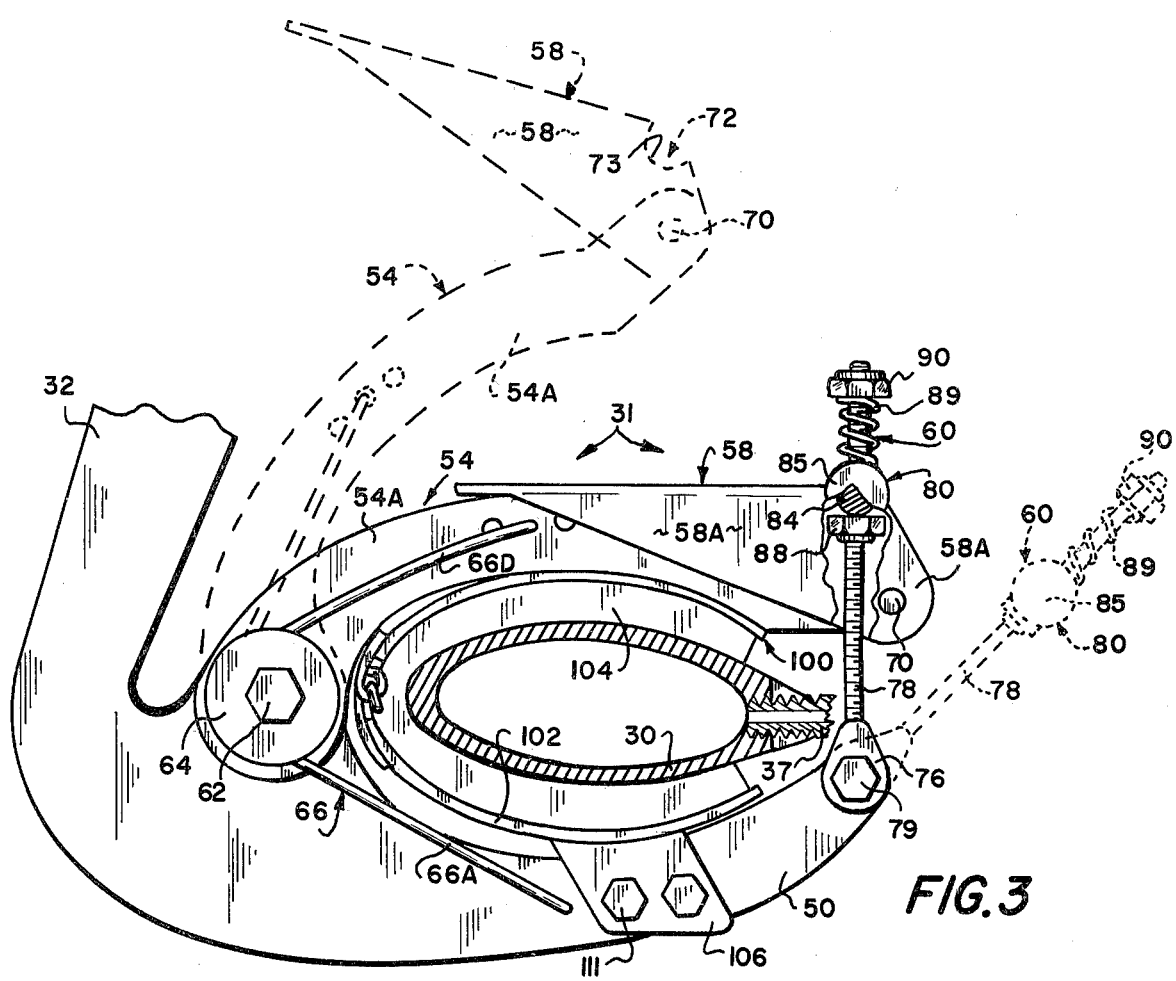
FIG. 3 is an enlarged, side elevational view of a mounting clamp constructed in accordance with the teachings of the present invention, with parts thereof broken away or shown in section for clarity, and with moving parts shown in alternate positions in dashed lines.
Figure 4:
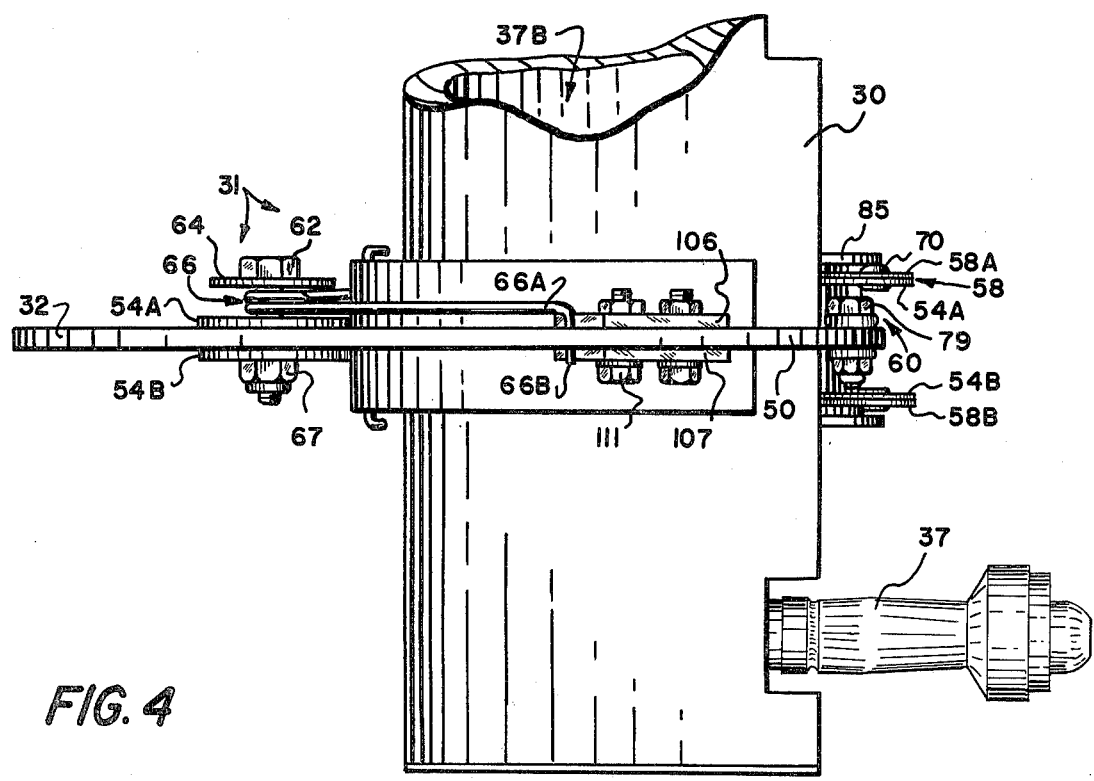
FIG. 4 is a bottom plan view of the clamping assembly and boom shown in FIG. 3, with parts thereof broken away for brevity.
Figure 5:
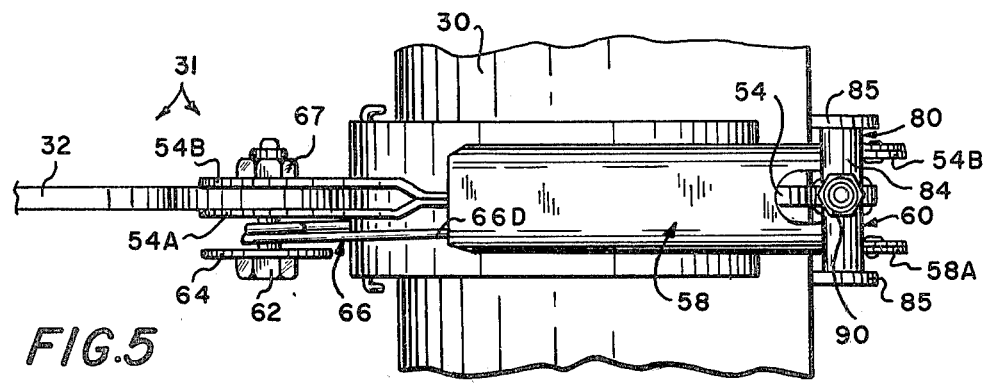
FIG. 5 is a top plan view of the clamping assembly, with the jaws illustrated in a closed position, and with parts of the spray boom broken away for brevity.

With primary reference now to FIGS. 3 through 5, the jaw clamping system 31 includes the rigid, elongated strut 32, which terminates in a generally arcuate jaw end 50. Jaw end 50 and the offset, remote mounting end 33 (FIG. 1) are preferably integral. End 33 is adapted to be coupled at the underside of wing 28 by structure 34, strut 32 is preferably formed of rigid aluminum or the like. Strut jaw end 50 cooperates with a generally arcuate, moveable jaw portion 54 pivotally coupled to the strut jaw end 50 at an innermost, pivot connection defined in the strut jaw end. Jaw portion 54 includes a jaw locking handle, generally designated by the reference numeral 58. Barrel connecting means, generally designated by the reference numeral 60, are preferably employed to couple the lower jaw strut 50 to the handle 58, whereby to fasten the jaw member about the tubular boom 30.

Preferably the moveable jaw 54 is formed from sheet metal by stamping or the like. Jaw 54 includes a pair of cooperating, spaced-apart side members 54A, 54B which sandwich strut 32, being secured between a conventional bolt 62 (and jam nut 67). Bolt 62 penetrates the innermost pivot connection point of the strut jaw end 50. Bolt 62 aligns and secures a washer 64, a bias spring, generally designated by the reference numeral 66, moveable jaw sides 54A, 54B, and terminates in jam nut 67.

Moveable jaw portion 54 is yieldably biased upwardly to the position illustrated in dashed lines in FIG. 3 by spring assembly 66. Spring 66 includes a lower portion 66A terminating in an offset end portion 66B (FIG. 4) which is received through a suitable orifice drilled in strut jaw portion 50. The intermediate, coiled portion of spring 66 is penetrated by bolt 62, and the opposite terminal portion 66D is similarly anchored to jaw 54.

Handle 58 is preferably stamped from sheet metal. It includes a pair of spaced-apart, parallel sides 58A, 58B which are pivotally coupled to jaw member sides 54A, 54B respectively by rivets 70. Thus, as indicated in dashed lines in FIG. 3, handle 58 may be moved relative to jaw portion 54. Rivet 70 is press fitted in a outer pivot point defined in jaw member 54. A tracking aperture, generally designated by the reference numeral 72, is defined in handle 58, and is adapted to receive the barrel connecting means 60, as will later be described, to fasten the jaws together. Tracking aperture 72 is formed between suitable notches 73 defined in the handle sides 58A, 58B. When handle 58 rotates about rivet 70, aperture 72 is moved overcenter.

The barrel connector means 60 includes a rigid clevis portion 76 which is secured to an elongated stem portion 78. Clevis 76 is secured by a conventional bolt 79 which penetrates an outermost pivot connection point defined in strut jaw end 50. Stem 78 secures and penetrates a rigid, generally cylindrical barrel member, generally designated by the reference numeral 80. The transverse, rigid cylindrical portion 84 is received within tracking aperture 72 of the handle 58. A pair of flanges 85 disposed on opposite ends of cylindrical member 84 prevent axial withdrawal of the barrel connecting means 80 from the tracking aperture 72. Member 84 will generally be confined between jam nut 88 and a generally cylindrical spring 89 secured coaxially about stem 78 by a retaining jam nut 90. As will be appreciated by those skilled in the art, limited axial displacement of member 84 with respect to stem 78 will be possible against yieldable bias from tension spring 89, which normally urges the barrel member into engagement within the tracking aperture 72.

Figures 6, 7:
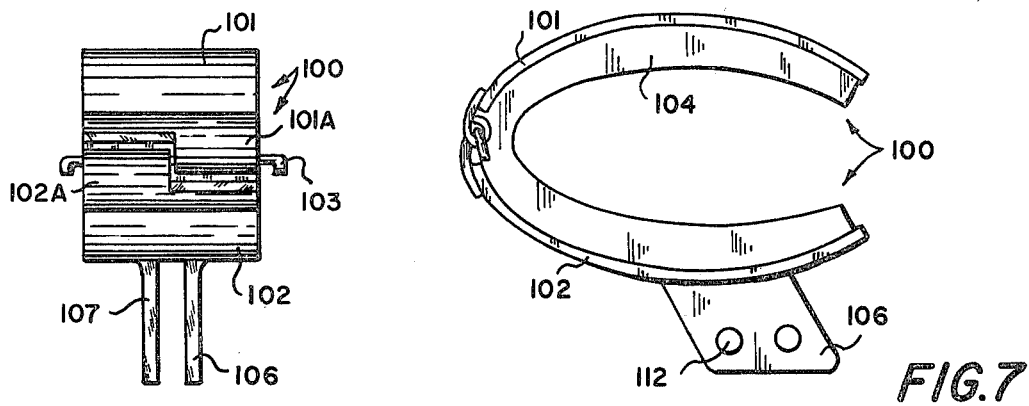
FIG. 6 is a rear plan view of the optional jaw pad assembly.
FIG. 7 is a side elevational view of an optional jaw pad assembly.

Preferably contact with the boom 30 within the jaw members is facilitated by a force distributing pad assembly. With reference now primarily to FIGS. 3 and 6-7, one suitable pad assembly 100 is illustrated. Assembly 100 includes upper, and lower generally arcuate, cooperating clamps 101, 102 terminating at their rears in hinge members 101A, 102A respectively which are pivotally coupled together by a pin 103. A suitable pad 104 comprised of plastic, rubber or other non-metallic material is confined within and between clamps 101, 102, and ultimately compressively contacts the boom 30. Assembly 100 includes a pair of spaced-apart mounting tabs 106, 107 which are secured to strut jaw end 50 by conventional bolts 111 which penetrate suitable orifices 112.

Figure 10:
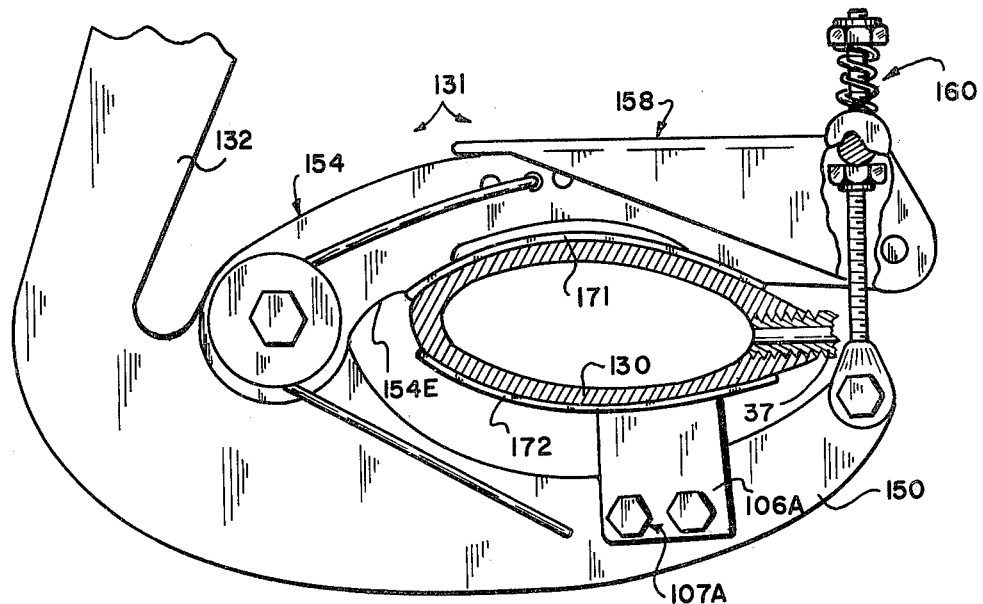
FIG. 10 is a side elevational view of a jaw clamping assembly similar to FIG. 3, but illustrating optional, boom contacting gripping clamps.

In FIG. 10 an alternative clamping assembly, generally designated by the reference numeral 131, is illustrated. Assembly 131 includes an elongated rigid strut 132 terminating in a jaw portion 150. Upper jaw member 154 is pivotally coupled to member 150, and it includes a pivoted, locking handle member 158 identical to locking handle 58 already discussed. As before, a barrel connecting means 160 is employed to releasably couple the jaws about a boom 130. However, the force distributing pad members are omitted. Instead, rigid, arcuate metallic clamps 171, 172 are employed to firmly grasp boom 130. While upper clamp 171 may be welded to jaw 154 about its lowermost curved surface 154E, clamp member 172 is elevated above jaw 150 by a pair of mounting tabs 106A, which are rigidly coupled to strut jaw end 150 by conventional jam nut/bolt assemblies 107A.

Figure 11:
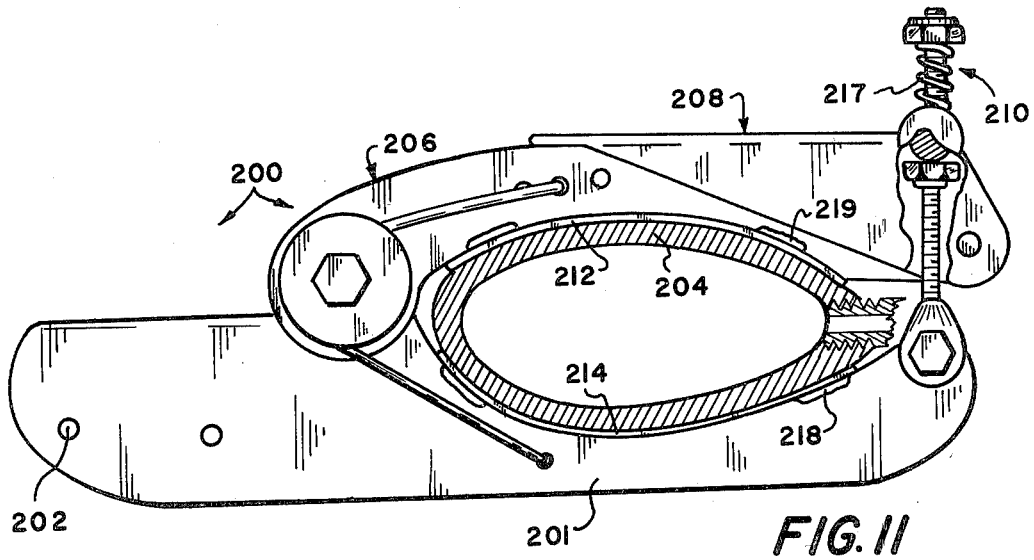
FIG. 11 is a side elevational view of an alternative embodiment of spray boom clamping assembly constructed in accordance with the teachings of this invention, illustrating an alternative strut terminal jaw end and modified gripping clamps.
Figure 12:
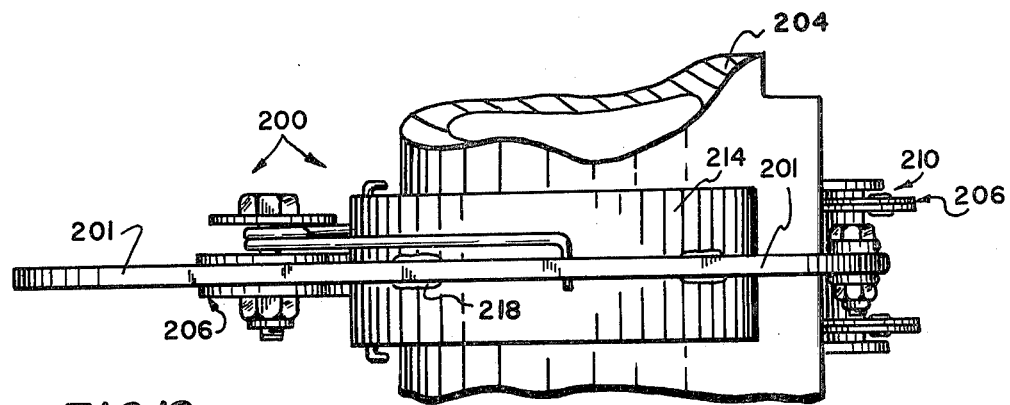
FIG. 12 is a bottom plan view of the apparatus of FIG. 11.

Turning now to FIGS. 11 and 12, an alternative embodiment of a clamping assembly, generally designated by the reference numeral 200, is illustrated. Assembly 200 includes a strut jaw end 201 which is adapted to be coupled to an accessory strut link (not shown) by welding or the like. It may be bolted to such links through orifices 202. Boom 204 will be coupled between strut jaw end 201 and the upper, cooperating moveable jaw portion 206, which is similar to upper jaw 54 discussed earlier in conjunction with FIG. 3. Similarly, the locking handle 208 pivoted at the front of jaw 206 cooperates with a barrel connecting means 210 to lock the apparatus about the boom 204.

Embodiment 200 contemplates compressive boom engaging clamps 212, 214 of generally arcuate cross section, which are spt welded as at 218, 219 directly to the jaw members. It will be appreciated that the resilience encountered in conjunction with the use of padded members such as members 104 discussed in conjunction with FIG. 3, is compensated for by the spring 217 of the barrel connecting means 210.

Figures 8, 9:
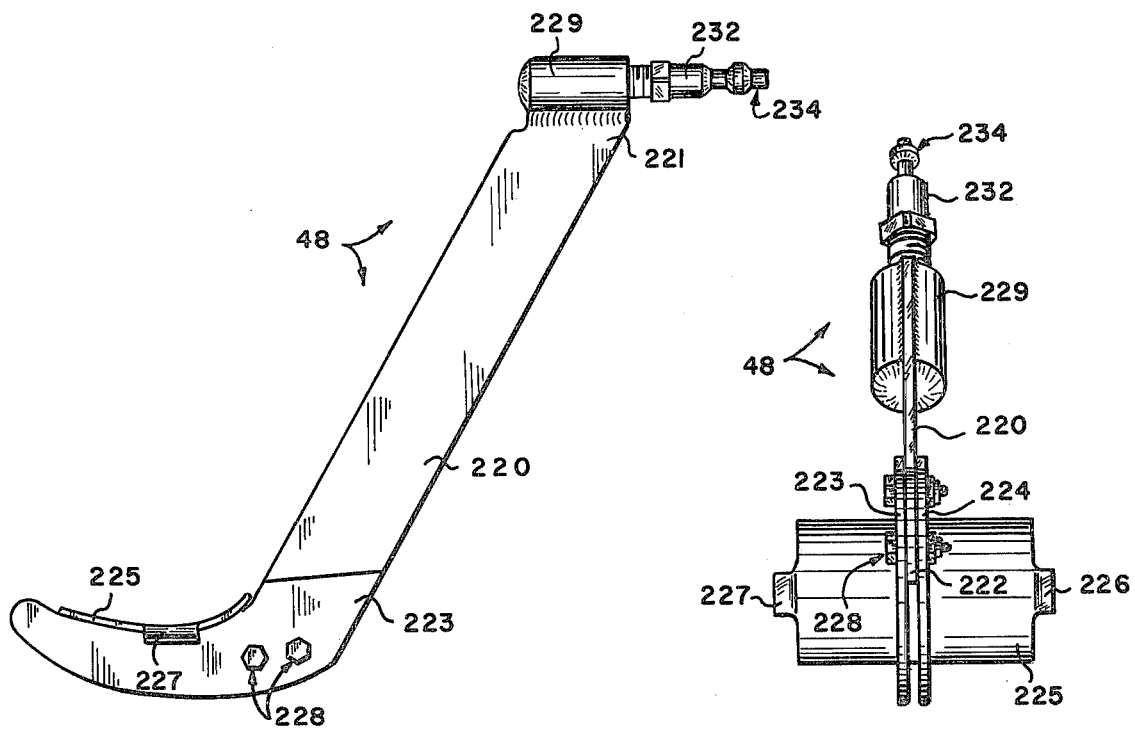
FIG. 8 is a side elevational view of an alternative spray boom mounting strut.
FIG. 9 is a bottom plan view of the strut of FIG. 8.

With reference now to FIGS. 8-9, an alternative boom supporting strut system 48 is adapted to be employed as illustrated in FIG. 2. Strut 48 includes generally inclined, central body member 220 which is sandwiched at its bottom 222 between opposite, parallel clamp mounts 223, 224 which support a generally arcuate, planar clamp shelf 225. Jam nut/bolt assemblies 228 secure mounts 223, 224. The opposite, outwardly directed tabs 226, 227 extending from shelf 225 are employed as "tie downs" to secure boom 41 in combination with ties 228. The upper portion 221 of the strut 220 terminates in a generally cylindrical, rigid barrel-like member 229 which is threaded to receive a hydraulic, quick connect fitting 232. The "snap fit end" 234 of fitting 232 may be quickly fitted into suitable female quick connect fittings 237 disposed at intervals about the wing 44.

Figure 13:
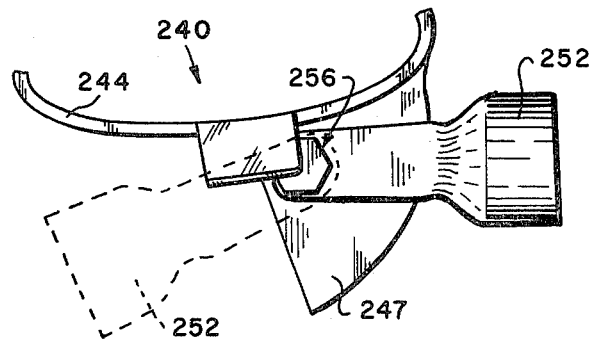
FIG. 13 is a side elevational view of an optional spray boom supporting cradle adapted to be coupled to suitable mounting structure; and, FIG. 14 is a bottom plan view of the cradle system of FIG. 13.
Figure 14:
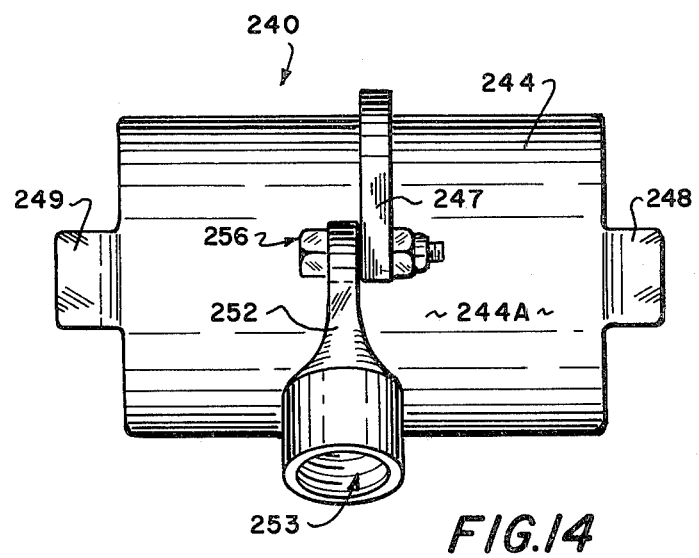

Turning now to FIGS. 13 and 14, boom support clamp assembly 240 includes a central, generally arcuate, rigid metallic clamp shelf member 244 similar to clamp 225 discussed previously. Shelf 244 includes opposite end tabs 248, 249 which are integral with shelf 244 and which are adapted to receive a suitable tie down. A rigid, generally verticle, central web 247 welded to the bottom 244A of shelf 244 is coupled to a pivotal link 252 by a jam nut/bolt assembly 256. Threaded aperture 253 will receive suitable external links whereby to mount the clamp 244 appropriately for use. As indicated in FIG. 13, clamp 244 and link 252 are pivotally moveable with respect to each other, facilitating ease of installation and adjustments to operational orientation.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A clamping system for securely, removably mounting a spray boom assembly to an agrichemical applicator airplane, the clamping assembly comprising:
   a rigid elongated strut having a remote end adapted to be coupled to the wing of said airplane and an integral, spaced-apart jaw end;
   said strut jaw end being generally arcuate and having an innermost pivot connection point and an outermost pivot connection point;
   a rigid, generally arcuate moveable jaw portion pivotally coupled to said strut jaw end innermost pivot connection point for securing a spray boom between it and said strut jaw end, the jaw portion terminating in an outer pivot point;
   jaw locking handle pivotally coupled to said jaw portion at said outermost pivot point for releasably locking said jaw portion in boom holding relation relative to said strut jaw end; said jaw portion locking handle developing an overcenter action when rotated relative to said outer pivot point whereby to realasably lock said jaw portion relative to said strut jaw end; and,
   barrel connecting means extending between said outermost pivot connection point of said strut jaw end and adapted to be received within a suitable tracking aperture defined in said locking handle.

2. The combination as defined in claim 1 wherein:
   said tracking aperture comprises a pair of cooperating, spaced-apart notches defined in opposite sides of said jaw locking handle adapted to receive said barrel connecting means; and,
   said barrel connecting means includes:
      an elongated, rigid, cylindrical barrel member adapted to be received by and between said notches; and,
      an elongated stem extending from a clevis pivotally coupled to said outermost pivot connection point and coupled to said barrel member.

3. The combination as defined in claim 2 wherein said barrel member includes rigid flanges on its opposite ends for preventing axial withdrawal of said barrel member from said tracking aperture.

4. The combination as defined in claim 3 wherein:
   said stem terminates in a threaded end portion which penetrates said barrel member; and,
   said stem includes a tension spring coaxially mounted thereon for yieldably biasing said barrel member into engagement with said aperture.

5. The combination as defined in claim 4 including force distributing pad members associated with each of said strut jaw end and said arcuate moveable jaw portion for securely grasping said spray boom therebetween.

6. The combination as defined in claim 5 including spring means for yieldably biasing said moveable jaw portion towards an open position relative to said strut jaw end.

7. The combination as defined in claim 5 wherein said remote end of the strut terminates in a hydraulic quickdisconnect fitting adapted to be snap fitted to supportive structure mounted to the wing of the airplane.

8. The combination as defined in claim 4 including a force distributing pad assembly adapted to be rigidly mounted between said moveable jaw portion and said strut jaw end, the pad assembly comprising a pair of cooperating, jaw-like pads coupled together for pivotal tracking movement.

* * * * *